United States Patent
Park et al.

(10) Patent No.: US 8,660,367 B1
(45) Date of Patent: Feb. 25, 2014

(54) TEMPLATE MATCHING SYSTEMS, METHODS, AND ARTICLES OF MANUFACTURE

(75) Inventors: Alden Eugene Park, Ridgecrest, CA (US); Brent James Sundheimer, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 43 days.

(21) Appl. No.: 13/556,491

(22) Filed: Jul. 24, 2012

(51) Int. Cl.
*G06K 9/68* (2006.01)
*G06K 9/00* (2006.01)

(52) U.S. Cl.
USPC .......................................... 382/217; 382/151

(58) Field of Classification Search
USPC .......... 382/151, 209, 217–218, 255, 294, 305
See application file for complete search history.

(56) References Cited

U.S. PATENT DOCUMENTS

| | | | |
|---|---|---|---|
| 8,194,946 B2 * | 6/2012 | Ida et al. | 382/128 |
| 2012/0257041 A1 * | 10/2012 | Nakagaki et al. | 348/80 |
| 2013/0148860 A1 * | 6/2013 | Musatenko et al. | 382/107 |

* cited by examiner

*Primary Examiner* — Daniel Mariam
(74) *Attorney, Agent, or Firm* — Christopher L. Blackburn

(57) ABSTRACT

Systems, articles of manufacture, and methods for template matching at least one template image and an image to be searched using a plurality of template matchers at at least one alignment shift.

15 Claims, 2 Drawing Sheets

TEMPLATE MATCHING SYSTEMS, METHODS, AND ARTICLES OF MANUFACTURE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to digital image processing, and more particularly, template matching.

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Figure 1:
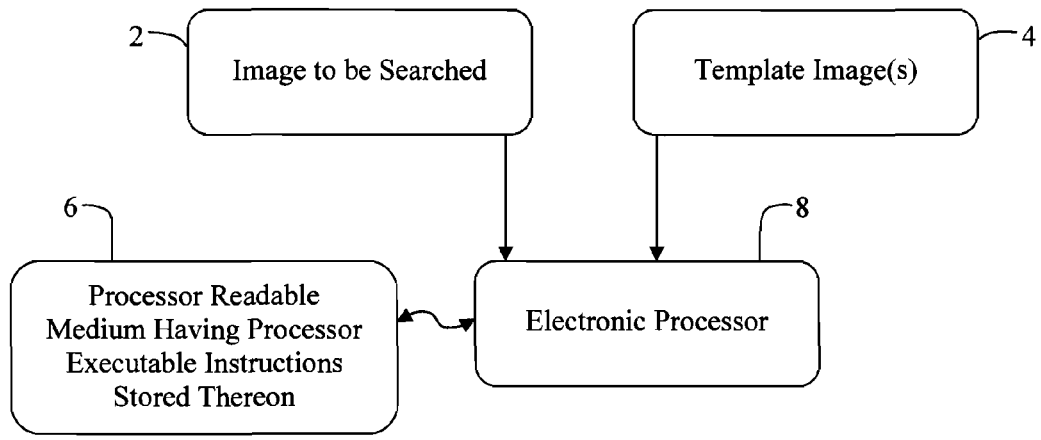
FIG. 1 is a block diagram of an embodiment of a system including a processor readable medium having processor executable instructions stored thereon, an electronic processor, and input data (in the form of an image to be searched and a template image).

With reference to FIG. 1, the invention generally relates to systems and methods to estimate alignment measure of at least one template image 4 and an image to be searched 2. Embodiments allow entities to be simultaneously compared using a variety of different template matchers, which preserve contextual information. Note that not all template matchers need not correspond to alignment measure per se, but to similarly preserve comparison of the same underlying entities, any measures extracted from smoothed versions should also be evaluated for the same relative alignment of their versions without smoothing.

With reference to FIG. 1, the template image(s) 4 and image to be searched 2 are digital images (vector or raster type) in some embodiments. System and article of manufacture embodiments include one or more non-transitory processor-readable medium (devices, carriers, or media) 6 having stored thereon a plurality of instructions, that, when executed by the electronic processor (typically a central processing unit—an electronic circuit which executes computer programs, containing a processing unit and a control unit) 8, cause the processor 8 to process/manipulate/act on data according to the plurality of instructions. The non-transitory medium 6 can be any non-transitory processor 8 readable medium (media), including, for example, a magnetic storage media, "floppy disk", CD-ROM, RAM, a PROM, an EPROM, a FLASH-EPROM, any other memory chip or cartridge, a file server providing access to the programs via a network transmission line, holographic unit, etc. Of course, those skilled in the art will recognize that many modifications may be made to this configuration without departing from the scope. In some system embodiments, the electronic processor 8 is co-located with the processor readable medium 6; in other system embodiments, the electronic processor 8 is remotely located from the processor readable medium 6.

As used herein, alignment measure is the measure of the relative position of the template image(s) 4 with respect to data to which the template image(s) 4 is being compared.

There is no universal or exact definition of what constitutes a feature, and the exact definition often depends on the problem or the type of application. Given that, a feature is defined as an "interesting" part of an image, and features are used as a starting point for many computer vision algorithms. Exemplary feature categories are provided:

Edges. Edges are points where there is a boundary (or an edge) between two image regions. In general, an edge can be of almost arbitrary shape, and may include junctions. In practice, edges are usually defined as sets of points in the image which have a strong gradient magnitude. Furthermore, some common algorithms will then chain high gradient points together to form a more complete description of an edge. These algorithms usually place some constraints on the properties of an edge, such as shape, smoothness, and gradient value. Locally, edges have a one dimensional structure.

Corners/interest points. The terms corners and interest points are used somewhat interchangeably and refer to point-like features in an image, which have a local two dimensional structure. These points are frequently known as interest points, but the term "corner" is used by tradition.

BLOBs/regions of interest or interest points. BLOBs provide a complementary description of image structures in terms of regions, as opposed to corners that are more point-like. Nevertheless, BLOB descriptors often contain a desired point (a local maximum of an operator response or a center of mass) which means that many BLOB detectors may also be regarded as interest point operators. BLOB detectors can detect areas in an image which are too smooth to be detected by a corner detector.

Ridges. For elongated objects, the notion of ridges is a natural tool. A ridge descriptor computed from a grey-level image can be seen as a generalization of a medial axis. From a practical viewpoint, a ridge can be thought of as a one-dimensional curve that represents an axis of symmetry, and in addition has an attribute of local ridge width associated with each ridge point.

An alignment shift is defined as a position of the center (or the origin) of the template image(s) 4 with respect to the image to be searched 2; each alignment shift describes a different position of the center of the template image(s) 4 with respect to the image to be searched 2 than each other alignment shift.

Figure 2:
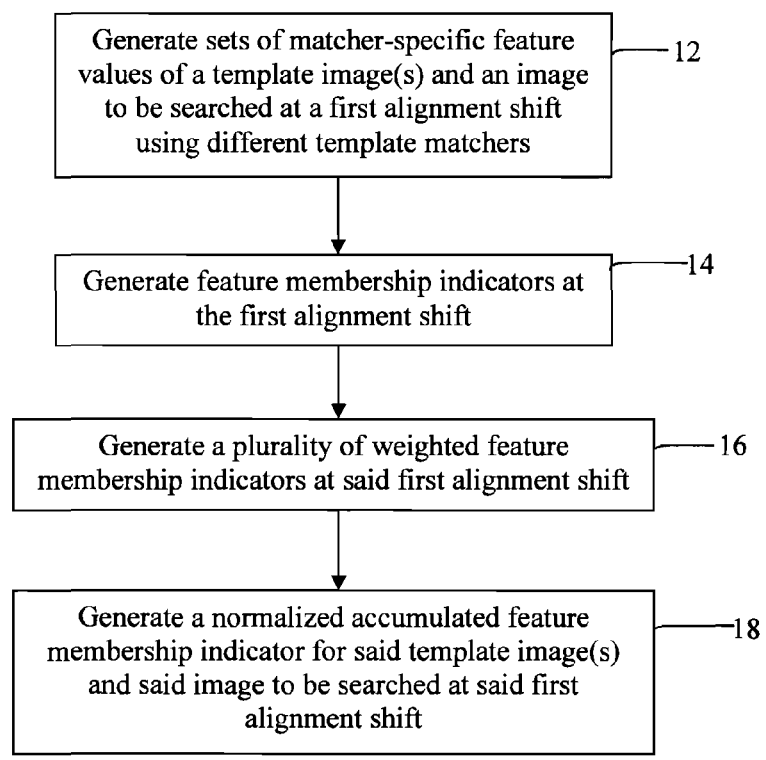
FIG. 2 is a block diagram illustrating processes, generally stated instruction descriptions, and generally stated processor functions when executing the instructions, of an embodiment of the invention at a high level.

With reference to FIGS. 1 and 2, the plurality of processor executable instructions include instructions that, when executed by the electronic processor 8, cause the electronic processor 8 to generate a plurality of sets of matcher-specific feature values of at least one template image 4 and an image to be searched 2 (block 12 in FIG. 2); each of the plurality of sets of matcher-specific feature values is a plurality of feature value measurements generated by template matching the image to be searched 2 and a corresponding template image 4 at a first alignment shift using one of a plurality of template matchers—wherein each set is a group of feature values of data/pixels spanned by its corresponding template image 4 at the then-current alignment shift (t). Each template matcher calculates a matcher-specific feature value using a mathematical comparison technique. A feature value measurement is mathematically represented herein as F(t, m, p), wherein:

't' represents the alignment shift at which the feature value measurement was generated, 'm' represents the template matcher that was used to generate the feature value measurement, and 'p' represents the template coordinate of the pixel that the feature value measurement characterizes.

For the purposes of this specification, including the claims, mathematical comparison techniques can vary based on template image, distance metric, statistical model, m-estimator, and feature category. Non-exclusive examples of distance metrics include, for example, Sum of Absolute Differences, Euclidean Distance, Bhattacharya Distance, and Manhattan Distance (and includes image to be searched 2 being smoothed with different smoothing kernels). A template image can vary based on any characteristic/attribute of digital imagery (wherein "imagery characteristic" as used herein refers to characteristics/attributes of digital images, such as, for example, image resolution and contrast). A template image used in a template matcher is treated as being the same template image as the template image used in another template matcher, if the two template images are of the same scene and have the same imagery characteristics. For the purposes of this application, a first mathematical comparison technique is treated as being different than a second mathematical comparison technique if the first mathematical comparison technique matches using a different template image and/or employs a different distance metric, statistical model, m-estimator and/or feature category than the second mathematical comparison technique. Feature categories are generally described as above (edge, corner, BLOB, ridge). Each of the plurality of sets of matcher-specific feature values generated at an alignment shift is generated using a different template matcher than each of the other template matchers used to generate the other sets of matcher-specific feature values at the alignment shift.

For example, consider an embodiment in which a first template matcher causes the processor 8 to generate a first set of matcher-specific feature values using a Sum of Absolute Differences (SAD) BLOB-based template matcher that matches using a first template image of a scene, and a second template matcher causes the processor 8 to generate a second set of matcher-specific feature values using a Bhattacharya BLOB-based template matcher that matches using the first template image (the template image used by the second template matcher is of the same scene, and has the same imagery characteristics, as the first template image). In this example, both the first template matcher and the second template matcher use the same feature category—BLOBs—for matching analysis; also, the first template matcher and second template matcher match using the same template image. However, as the distance metric of the first template matcher is different than the distance metric used by the second template matcher, the first template matcher is considered to use a different mathematical comparison technique than the second template matcher, and is thus considered to be a different template matcher than the second template matcher for the purposes of this patent application.

The plurality of processor executable instructions further include instructions that, when executed by the processor 8, cause the processor 8 to generate a plurality of feature membership indicators (for the alignment shift) by normalizing each of the feature value measurements of the plurality of sets of matcher-specific feature values (generated at the alignment shift) so that each of the plurality of feature membership indicators is a value between and including 0 and 1 (block 14). When executed by the processor 8, this instruction(s) causes the processor 8 to generate a plurality of sets of feature membership indicators formed of feature membership indicators, where each of the set of feature membership indicators is a normalized set of a corresponding set of the plurality of sets of matcher-specific feature values. M(t,m,p) is used herein to designate a feature membership indicator, wherein:

't' represents the alignment shift at which the feature value measurement from which the feature membership indicator is generated and normalized, 'm' represents the template matcher that was used to generate the feature value measurement from which the feature membership indicator was normalized, and 'p' represents template coordinate of the pixel that the feature value measurement from which the feature membership indicator was normalized characterizes.

As an example, the feature membership indicator mathematically denoted by M(1,1,1) would be the feature membership indicator (value) at a first template coordinate (p=1) generated by normalizing the feature value measurement generated at the first template coordinate that was generated by template matching the template image (used by template matcher m=1) to the image to be searched 2 at a first alignment shift (t=1) using a template matcher arbitrarily designated by m=1. So, each set of feature membership indicators is a normalized set of feature values determined by normalizing the set of feature values generated by template matching the image to be searched 2 and corresponding template image at a first alignment shift using one of a plurality of template matchers.

The plurality of processor executable instructions further includes instructions that, when executed by the processor 8, cause the processor 8 to assign each feature membership indicator a corresponding weighting or value. Weighting values are generally mathematically represented herein by W(t, m,p), where 't' represents alignment shift, 'm' represents template matcher, and 'p' represents template coordinate.

The plurality of processor executable instructions further include instructions that, when executed by the processor 8, cause the processor 8 to generate a plurality of weighted feature membership indicators WM(t,m,p)=W(t,m,p)M(t,m, p) (at the alignment shift, t) by weighting the feature membership indicators according to the feature membership indicator's corresponding weighting value, where 't' represents alignment shift, 'm' represents template matcher, and 'p' represents template coordinate (block 16). Each feature membership indicator's corresponding weighting value is generated using any known method or means of generating a weighting value that is proportional to how well the weighting value's corresponding feature membership indicator characterizes the data. The feature membership indicators and their weights allow practical management of unavoidable modeling uncertainties between template images and measured data (image to be searched). In some embodiments, the weighting value of feature values are determined by training using representative templates.

In some embodiments, the weighting value assigned to a feature membership indicator is either a 0 or a 1. However, in other embodiments, any weighting values between and including 0 and 1 one can be used.

The plurality of processor executable instructions further include instructions that, when executed by the processor 8, cause the processor 8 to generate a normalized accumulated feature membership indicator (a normalized accumulated feature membership indicator being a mathematical representation of a shape in data) of/for the template image(s) used by the plurality of template matchers at the alignment shift and the image to be searched 2 at the first alignment shift by summing each of the plurality of weighted feature membership indicators across template matcher (m) and template coordinate (p) and dividing by a sum of each of the plurality of weighted feature membership indicators' weighting amount (block 18). This is discretely mathematically described by Equation 1 and integrally mathematically described by Equation 2.

$$A(t) = \frac{\sum_{m=1}^{l}\sum_{p=1}^{n} WM(t, m, p)}{\sum_{m=1}^{l}\sum_{p=1}^{n} W(t, m, p)} \quad \text{Equation 1}$$

$$A(t) = \frac{\sum_{m=1}^{l} \int\int_{p} WM(t, m, p) dp}{\sum_{m=1}^{l} \int\int_{p} W(t, m, p) dp} \quad \text{Equation 2}$$

In equations 1 and 2, l represents the total number of template matchers used to generate the plurality of sets of feature values at the first alignment shift (l=# of sets=# of template matchers used to generate the sets at the alignment shift (t)). In equation 1, n represents the total number of pixels at which a feature value was calculated at the first alignment shift (n=# of pixel coordinates measured at the alignment shift (t)).

Example Using Two "Template Matchers" That Use the Same Template Image

Figure 3:
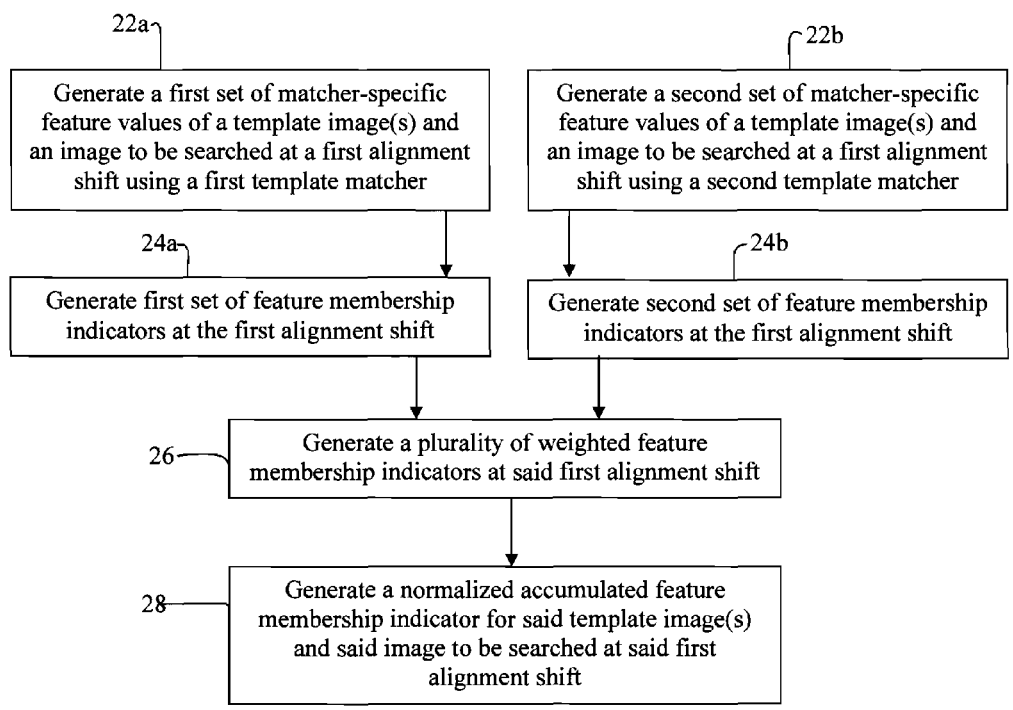
FIG. 3 is a block diagram of illustrating processes, generally stated instruction descriptions, and generally stated processor functions when executing the instructions, of an embodiment of the invention using two template matchers at a high level.

With reference to FIGS. 1 and 3, some system and article of manufacture embodiments using two template matchers are described; note that it is understood that more than two template matchers can be used, and this example is only provided to illustratively describe some embodiments of the invention that use two template matchers (for example, three (or more) different template matchers could be employed at the alignment shift, in which case (at least) three sets of feature value measurements would be generated at the alignment shift and processed to produce the normalized accumulated feature membership indicator at the alignment shift).

In this example, a system using two template matchers includes a processor 8 executable medium 6 having stored thereon a plurality of instructions, that, when executed by the processor 8, cause the processor 8 to generate a first set of feature values of a template image 4 and an image to be searched 2 at a first alignment shift by template matching the template image 4 to the image to be searched 2 at the first alignment shift using a first template matcher (block 22a).

The plurality of instructions also include instructions that, when executed by the processor 8, cause the processor 8 to generate a second set of feature values of the template image 4 and the image to be searched 2 at the first alignment shift by template matching the template image 4 to the image to be searched 2 at the first alignment shift using a second template matcher (block 22b). Note that in this example, the first template matcher and second template matcher employ the same template image; therefore, according to the principles of embodiments of the invention, the first template matcher uses a different distance metric, statistical model, m-estimator, and/or feature category than the second template matcher.

In some embodiments, the instructions that, when executed by the processor 8, cause the processor 8 to generate the first set of feature values includes code to implement a template matcher (instructions) employing a first feature category, and the instructions that, when executed by the processor 8, cause the processor 8 to generate the second set of feature values includes code to implement a template matcher employing a second feature category, wherein the first feature category is different than the second feature category. In some of these embodiments, the first feature category and the second feature category are selected from the group of feature categories consisting of edges, corners, BLOBs, and ridges. So, in some embodiments, when executed by the processor 8, the processor 8 executable instructions cause the processor 8 to generate the first set of feature values, for example, using an edge-based template matcher, and to generate the second set of feature values, for example, using a corner-based template matcher. In these embodiments, any permutation of feature categories is contemplated.

In some embodiments, the instructions that, when executed by the processor 8, cause the processor 8 to generate the first set of feature values includes code to implement a template matcher employing a first distance metric, and the instructions that, when executed by the processor 8, cause the processor 8 to generate the second set of feature values includes code to implement a template matcher employing a second distance metric, wherein the first distance metric is different than the second distance metric. In some embodiments, the first and second distance metrics are selected from the group of distance metrics consisting of Sum of Absolute Differences, Euclidean Distance, Bhattacharya Distance, and Manhattan Distance techniques.

The plurality of instructions also include instructions that, when executed by the processor 8, cause the processor 8 to generate a first plurality of feature membership indicators by normalizing the first set of feature values (block 24a).

The plurality of instructions also include instructions that, when executed by the processor 8, cause the processor 8 to generate a second plurality of feature membership indicators by normalizing the second set of feature values (block 24b).

The plurality of instructions also include instructions that, when executed by the processor 8, cause the processor 8 to generate a plurality of weighted feature membership indicators by weighting each of the plurality of feature membership indicators a weighting amount corresponding to how well a feature value measurement normalized to generate the feature membership indicator characterizes its data (block 26).

The plurality of instructions also include instructions that, when executed by the processor 8, cause the processor 8 to generate a normalized accumulated feature membership indicator for the template image 4 and the image to be searched 2 at the first alignment shift by summing each of the plurality of weighted feature membership indicators across feature type and template coordinate and dividing by a sum of each of the plurality of weighted feature membership indicators' weighting amount (block 28).

With reference to FIG. 1, method embodiments include:
 generating a plurality of sets of matcher-specific feature values of a template image 4 and an image to be searched 2, wherein each of the plurality of sets of matcher-specific feature values is a plurality of feature value measurements F(t, m, p) generated by template matching the image to be searched 2 and the template image 4 at a first alignment shift using one of a plurality of template matchers, and wherein each of the plurality of sets of matcher-specific feature values is generated using a different of the plurality of template matchers than each other template matcher of the plurality of template matchers used to generate each of the other of the plurality of sets of matcher-specific feature values;

generating a plurality of sets of feature membership indicators M(t, m, p) at the first alignment shift by normalizing all of the plurality of sets of matcher-specific feature values at the first alignment shift;

generating a plurality of weighted feature membership indicators WM(t,m,p) at the first alignment shift by weighting each of the plurality of feature membership indicators M(t,m,p) a weighting amount corresponding to how well a feature value measurement normalized to generate the feature membership indicator characterizes its data; and generating a normalized accumulated feature membership indicator for the template image 4 and the image to be searched 2 at the first alignment shift by summing each of the plurality of weighted feature membership indicators WM(t,m,p) across template matcher and template coordinate and dividing by a sum of each of the plurality of weighted feature membership indicators' weighting amount, W(t,m,p), as mathematically described in Equations 1 and 2.

Once generated, the normalized accumulated feature membership indicators at multiple alignment shifts are available for analysis to identify the best normalized accumulated feature membership indicator, i.e., the normalized accumulated feature membership indicator at the alignment shift at which the template image 4 best matches the image to be searched 2. In some embodiments, the normalized accumulated feature membership indicator having the highest magnitude is treated as being the best normalized accumulated feature membership indicator. The best match alignment shift location ($t_{best\ match}$) is deduced from the normalized accumulated feature membership indicator identified as being the "best", i.e., the location of the alignment shift of the "best" normalized accumulated feature membership indicator is treated as the best match alignment shift location ($t_{best\ match}$) for the template image.

Extension to Multiple Template Images

Note that the systems and method embodiments described in the above Example Using Two "Template Matchers" That Use the Same Template Image section are described with reference to use of one template image; as previously mentioned, some embodiments of the invention are extended to use template images that have different imagery characteristics.

For example, consider an embodiment in which:

a first template matcher causes the processor 8 to generate a first set of matcher-specific feature values at a first alignment shift using a Sum of Absolute Differences (SAD) BLOB-based template matcher that matches using an image of a scene at a first resolution (first template image), a second template matcher causes the processor 8 to generate a second set of matcher-specific feature values at the first alignment shift using a Sum of Absolute Differences BLOB-based template matcher that matches using an image of the scene at a second resolution (second template image), and a third template matcher causes the processor 8 to generate a third set of matcher-specific feature values at the first alignment shift using a Euclidian Distance corner-based template matcher that matches an image of the scene at the first resolution (first template image).

In this embodiment, the first template matcher and the second template matcher use the same feature category—BLOBs—for matching analysis; also, the first template matcher and second template matcher employ the same distance metric—SAD. However, as the resolution of the template image used by the first template matcher is different than the resolution of the template image used by the second template matcher, the imagery characteristics of the first template image are different than the imagery characteristics of the second template image. As the first and second template images have different imagery characteristics, the first template matcher is considered to use a different mathematical comparison technique than the second template matcher, and is thus considered to be a different template matcher than the second template matcher for the purposes of this patent application. Also, as the first template matcher uses a different distance metric than the third template matcher, the first template matcher is considered to be a different template matcher than the third template matcher. Finally, as the second template matcher uses a different template image, distance metric, AND feature category than the third template matcher; each of those differences alone is sufficient to consider the second template matcher as being a different template matcher than the third template matcher for the purposes of this application.

Once generated, the normalized accumulated feature membership indicators at multiple alignment shifts are available for analysis to identify the best normalized accumulated feature membership indicator, i.e., the normalized accumulated feature membership indicator at the alignment shift at which the template images best match the image to be searched 2. In some embodiments, the normalized accumulated feature membership indicator having the highest magnitude is treated as being the best normalized accumulated feature membership indicator. The best match alignment shift location ($t_{best\ match}$) is deduced from the normalized accumulated feature membership indicator identified as being the "best", i.e., the location of the alignment shift of the "best" normalized accumulated feature membership indicator is treated as the best match alignment shift location ($t_{best\ match}$) for the template image.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method of generating an alignment measure, comprising:

generating a plurality of sets of matcher-specific feature values of at least one template image and an image to be searched at a first alignment shift, wherein each of said plurality of sets of matcher-specific feature values is a plurality of feature value measurements generated by template matching said image to be searched and a corresponding of said at least one template image at a first alignment shift using one of a plurality of template matchers, and wherein each of said plurality of sets of matcher-specific feature values is generated using a different of said plurality of template matchers than each other template matcher of said plurality of template matchers used to generate each of the other of said plurality of sets of matcher-specific feature values;

generating a plurality of sets of feature membership indicators at said first alignment shift by normalizing all of said plurality of sets of matcher-specific feature values at said first alignment shift;

generating a plurality of weighted feature membership indicators at said first alignment shift by weighting each feature membership indicator of said plurality of sets of feature membership indicators a weighting amount corresponding to how well a feature value measurement normalized to generate its corresponding feature membership indicator characterizes its data; and generating a normalized accumulated feature membership indicator at said first alignment shift by summing each of said plurality of weighted feature membership indicators across template matcher and template coordinate and dividing by a sum of each of said plurality of weighted feature membership indicators' weighting amount;

wherein the method is performed using an electronic processor.

2. The method of claim 1, wherein said at least one template image comprises a plurality of template images, and at least one of said plurality of template matchers matches using a different of said plurality of template images than at least one of the other of said plurality of template matchers.

3. A method of generating an alignment measure, comprising:

generating a first set of feature values of a template image and an image to be searched at a first alignment shift by template matching said template image to said image to be searched at said first alignment shift using a first template matcher;

generating a second set of feature values of said template image and said image to be searched at said first alignment shift by template matching said template image to said image to be searched at said first alignment shift using a second template matcher;

generating a first plurality of feature membership indicators by normalizing said first set of feature values;

generating a second plurality of feature membership indicators by normalizing said second set of feature values;

generating a plurality of weighted feature membership indicators by weighting each feature membership indicator of said first and second plurality of feature membership indicators a weighting amount corresponding to how well a feature value measurement normalized to generate the feature membership indicator characterizes its data; and generating a normalized accumulated feature membership indicator for said template image and said image to be searched at said first alignment shift by summing each of said plurality of weighted feature membership indicators across feature type and template coordinate and dividing by a sum of each of said plurality of weighted feature membership indicators' weighting amount;

wherein the method is performed using an electronic processor.

4. The method of claim 3, wherein said first template matcher employs a first feature category and said second template matcher employs a second feature category; wherein said first feature category is different than said second feature category.

5. The method of claim 4, wherein:

said first feature category is selected from the group of feature types consisting of edges, corners, BLOBs, and ridges; and said second feature category is selected from the group of feature types consisting of edges, corners, BLOBs, and ridges.

6. The method of claim 3, wherein:

said first template matcher employs a different distance metric than said second template matcher.

7. A system to generate an alignment measure, the system comprising:

an electronic processor having a central processing unit;

a non-transitory electronic-processor-readable medium having a plurality of electronic processor executable instructions stored thereon that when executed by an electronic processor, cause the electronic processor to:

generate a first set of feature values of a template image and an image to be searched at a first alignment shift by template matching said template image to said image to be searched at said first alignment shift using a first template matcher;

generate a second set of feature values of said template image and said image to be searched at said first alignment shift by template matching said template image to said image to be searched at said first alignment shift using a second template matcher;

generate a first plurality of feature membership indicators by normalizing said first set of feature values;

generate a second plurality of feature membership indicators by normalizing said second set of feature values;

generate a plurality of weighted feature membership indicators by weighting each feature membership indicator of said first and second plurality of feature membership indicators a weighting amount corresponding to how well a feature value measurement normalized to generate the feature membership indicator characterizes its data; and generate a normalized accumulated feature membership indicator for said template image and said image to be searched at said first alignment shift by summing each of said plurality of weighted feature membership indicators across feature type and template coordinate and dividing by a sum of each of said plurality of weighted feature membership indicators' weighting amount.

8. The system of claim 7, wherein said first template matcher searches using a first feature category and said second template matcher employs a second feature category, wherein said first feature category is different than said second feature category.

9. The system of claim 8, wherein:

said first feature category is selected from the group of feature types consisting of edges, corners, BLOBs, and ridges; and said second feature category is selected from the group of feature types consisting of edges, corners, BLOBs, and ridges.

10. The system of claim 9, wherein:

said first template matcher employs a distance metric selected from the group of distance metrics consisting of Sum of Absolute Differences, Euclidean Distance, Bhattacharya Distance, and Manhattan Distance; and said second template matcher employs a distance metric selected from the group of distance metrics consisting of Sum of Absolute Differences, Euclidean Distance, Bhattacharya Distance, and Manhattan Distance, wherein said second template matcher's distance metric is a different metric than said first template matcher's distance metric.

11. The system of claim 7, wherein:
said first template matcher employs a distance metric selected from the group of distance metrics consisting of Sum of Absolute Differences, Euclidean Distance, Bhattacharya Distance, and Manhattan Distance; and
said second template matcher employs a distance metric selected from the group of distance metrics consisting of Sum of Absolute Differences, Euclidean Distance, Bhattacharya Distance, and Manhattan Distance, wherein said second template matcher's distance metric is a different distance metric than said first template matcher's distance metric.

12. A non-transitory electronic-processor-readable medium having a plurality of electronic processor executable instructions stored thereon that, when executed by an electronic processor, cause the electronic processor to perform a method of generating an alignment measure, the method comprising:
generating a first set of feature values of a template image and an image to be searched at a first alignment shift by template matching said template image to said image to be searched at said first alignment shift using a first template matcher;
generating a second set of feature values of said template image and said image to be searched at said first alignment shift by template matching said template image to said image to be searched at said first alignment shift using a second template matcher;
generating a first plurality of feature membership indicators by normalizing said first set of feature values;
generating a second plurality of feature membership indicators by normalizing said second set of feature values;
generating a plurality of weighted feature membership indicators by weighting each feature membership indicator of said first and second plurality of feature membership indicators a weighting amount corresponding to how well a feature value measurement normalized to generate the feature membership indicator characterizes its data; and
generating a normalized accumulated feature membership indicator for said template image and said image to be searched at said first alignment shift by summing each of said plurality of weighted feature membership indicators across feature type and template coordinate and dividing by a sum of each of said plurality of weighted feature membership indicators' weighting amount.

13. The non-transitory medium of claim 12, wherein said first template matcher employs a first feature category and said second template matcher employs a second feature category, wherein said first feature category is different than said second feature category.

14. The non-transitory medium of claim 13, wherein:
said first feature category is selected from the group of feature types consisting of edges, corners, BLOBs, and ridges; and
said second feature category is selected from the group of feature types consisting of edges, corners, BLOBs, and ridges.

15. The non-transitory medium of claim 14, wherein:
said first template matcher employs a distance metric selected from the group of distance metrics consisting of Sum of Absolute Differences, Euclidean Distance, Bhattacharya Distance, and Manhattan Distance; and
said second template matcher employs a distance metric selected from the group of distance metrics consisting of Sum of Absolute Differences, Euclidean Distance, Bhattacharya Distance, and Manhattan Distance, wherein said second template matcher's distance metric is a different metric than said first template matcher's distance metric.

* * * * *